United States Patent
Ding et al.

(10) Patent No.: US 9,733,769 B2
(45) Date of Patent: Aug. 15, 2017

(54) TOUCH DISPLAY DEVICE WITH TRANSPARENT ELECTRODES AND METHOD FOR MANUFACTURING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 14/434,680

(22) PCT Filed: Mar. 24, 2014

(86) PCT No.: PCT/CN2014/073927
§ 371 (c)(1),
(2) Date: Apr. 9, 2015

(87) PCT Pub. No.: WO2015/135225
PCT Pub. Date: Sep. 17, 2015

(65) Prior Publication Data
US 2016/0224147 A1 Aug. 4, 2016

(30) Foreign Application Priority Data
Mar. 10, 2014 (CN) .......................... 2014 1 0086453

(51) Int. Cl.
G06F 3/044 (2006.01)
G06F 3/041 (2006.01)

(52) U.S. Cl.
CPC ............ G06F 3/044 (2013.01); G06F 3/0412 (2013.01); G06F 2203/04103 (2013.01); G06F 2203/04112 (2013.01)

(58) Field of Classification Search
CPC ........ G06F 3/044; G06F 3/0412; G06F 3/041; G06F 2203/04103; G06F 2203/04112
See application file for complete search history.

(56) References Cited

U.S. PATENT DOCUMENTS

| | | | | |
|---|---|---|---|---|
| 5,231,525 A | * | 7/1993 | Yuasa ..................... | B29C 55/00 349/124 |
| 2009/0085894 A1 | | 4/2009 | Gandhi et al. | |

(Continued)

FOREIGN PATENT DOCUMENTS

| | | | |
|---|---|---|---|
| CN | 102937845 | * | 2/2013 |
| CN | 102937845 A | | 2/2013 |

(Continued)

OTHER PUBLICATIONS

Chinese First Office Action regarding Application No. 2014100864530 dated Apr. 20, 2016. Translation provided by Dragon Intellectual Property Law Firm.

(Continued)

*Primary Examiner* — Lisa Landis
(74) *Attorney, Agent, or Firm* — Harness, Dickey & Pierce, P.L.C.

(57) ABSTRACT

The present disclosure discloses a touch display device and its manufacturing method. The touch display device includes a first substrate and a second substrate arranged opposite to each other, a liquid crystal layer arranged between the first substrate and the second substrate, and (Continued)

receiver electrodes arranged on the first substrate and spaced apart from each other. First transparent electrodes spaced apart from each other are arranged on the first substrate and below the receiver electrodes in a direction where a display electrode on the second substrate is projected onto the first substrate. The first transparent electrode is spaced apart from the receiver electrode through an insulating layer, and connected to a constant potential.

13 Claims, 4 Drawing Sheets

(56) References Cited

U.S. PATENT DOCUMENTS

| | | | | |
|---|---|---|---|---|
| 2013/0260136 A1* | 10/2013 | Wu | ........................ | B82Y 40/00 |
| | | | | 428/323 |
| 2013/0271161 A1* | 10/2013 | Solven | .................... | G06F 3/041 |
| | | | | 324/661 |
| 2013/0314625 A1* | 11/2013 | Tsai | ........................ | G06F 3/044 |
| | | | | 349/12 |
| 2015/0002752 A1* | 1/2015 | Shepelev | ................ | G06F 3/044 |
| | | | | 349/12 |

FOREIGN PATENT DOCUMENTS

| | | |
|---|---|---|
| CN | 103049155 A | 4/2013 |
| CN | 103049157 A | 4/2013 |
| CN | 103164058 A | 6/2013 |
| CN | 103218097 A | 7/2013 |
| CN | 203706180 U | 7/2014 |

OTHER PUBLICATIONS

Written Opinion and International Search Report regarding Application No. PCT/CN2014/073927. Translation provided by Dragon Intellectual Property Law Firm.

* cited by examiner

TOUCH DISPLAY DEVICE WITH TRANSPARENT ELECTRODES AND METHOD FOR MANUFACTURING THE SAME

CROSS-REFERENCE TO RELATED APPLICATION

This application is the U.S. national phase of PCT Application No. PCT/CN2014/073927 filed on Mar. 24, 2014, which claims a priority to Chinese Patent Application No. 201410086453.0 filed on Mar. 10, 2014, the disclosures of which are incorporated in their entirety by reference herein.

TECHNICAL FIELD

The present disclosure relates to the field of touch technology, in particular to a touch display device and a method for manufacturing the same.

BACKGROUND

Touch screen, as an input medium, can facilitate a user's operation in a better manner as compared with a keyboard or mouse. Depending on different implementation principles, the touch screens may include a resistive touch screen, a capacitive touch screen, a surface-acoustic-wave touch screen and an infrared touch screen. Currently, the resistive and capacitive touch screens have been widely used.

A mutually capacitive touch screen has attracted more and more attentions due to its advantages such as high sensitivity and a multi-point touch function. As its basic principle, a voltage is applied to a driving line side and a signal change is detected at a detection line side. A driving line is configured to determine an X-axis coordinate, and a detection line is configured to determine a Y-axis coordinate. During the detection, the driving lines are scanned progressively in an X-axis direction, and a signal from each detection line is read when scanning each row of the driving lines. All junctions in each row and each column may be scanned at a time, and X*Y signals may be obtained. This detection mode may be used to determine the coordinates of multiple points, so it is able to achieve the multi-point touch function. FIG. 1 shows an equivalent circuit model, which includes a signal source 101, a driving line resistor 103, a mutual capacitor 102 between the driving line and the detection line, a parasitic capacitor 104 among the driving line, the detection line and a common electrode layer, a detection line resistor 105, and a detection circuit 106. When a screen is touched by a finger, a part of the current flows into the finger, which is equivalent to a change in the mutual capacitor 102 between the driving line and the detection line. A resultant tiny change in the current is then detected at a detection end by the detection circuit 106.

In an existing touch screen, there is a very large coupling capacitance between a transmitter electrode (TX) and/or a receiver electrode (RX) and electrodes on an array substrate. During the deflection of liquid crystals, the touch and detection operations will be adversely affected, and thereby the quality of the touch screen will be deteriorated.

SUMMARY

An object of the present disclosure is to prevent the touch and detection operations from being adversely affected by the above-mentioned coupling capacitance, thereby to improve the quality of a touch display device.

In one aspect, the present disclosure provides in one embodiment a touch display device, including a first substrate and a second substrate arranged opposite to each other, a liquid crystal layer arranged between the first substrate and the second substrate, and receiver electrodes arranged on the first substrate and spaced apart from each other. First transparent electrodes spaced apart from each other are arranged on the first substrate and below the receiver electrodes in a direction where a display electrode on the second substrate is projected onto the first substrate. The first transparent electrode is spaced apart from the receiver electrode through an insulating layer, and connected to a constant potential.

Alternatively, transmitter electrodes are arranged on the second substrate and spaced apart from each other, and the adjacent transmitter electrodes are spaced apart from each other by a first common electrode arranged at an identical layer.

Alternatively, a potential of the first transparent electrode is equal to that of the first common electrode.

Alternatively, transmitter electrodes are further arranged on the first substrate and spaced apart from each other. The transmitter electrodes and the receiver electrodes are alternately arranged at an identical layer. Second transparent electrodes are arranged below the transmitter electrodes and spaced apart therefrom by an insulating layer. The second transparent electrode and the first transparent electrode are alternately arranged at an identical layer to, and the second transparent electrode is connected to a constant potential.

Alternatively, a second common electrode is further arranged on the second substrate, and potentials of the first transparent electrode and the second transparent electrode are equal to a potential of the second common electrode.

Alternatively, the first transparent electrode and/or the second transparent electrode are conductive electrodes made of a transparent metal oxide, or made from a silver nanowire.

Alternatively, a light-shielding layer is arranged between the first substrate and a layer of the receiver electrodes.

In another aspect, the present disclosure provides in one embodiment a method for manufacturing a touch display device, including steps of providing a first substrate and a second substrate opposite to each other, and forming patterns of receiver electrodes spaced apart from each other on the first substrate. The method further includes steps of:

forming a pattern of a display electrode on the second substrate;

forming patterns of first transparent electrodes spaced apart from each other on the first substrate and below the receiver electrodes to be formed in a direction where the display electrode on the second substrate is projected onto the first substrate, the first transparent electrodes being connected to a constant potential;

forming an insulating layer on the first substrate with the patterns of the first transparent electrodes;

forming the patterns of the receiver electrodes spaced apart from each other on the insulating layer; and forming a liquid crystal layer between the first substrate and the second substrate opposite to each other.

Alternatively, the method further includes steps of forming patterns of transmitter electrodes and first common electrodes on the second substrate simultaneously by a single patterning process, and forming patterns of first common electrode lines on the second substrate, the adjacent transmitter electrodes being spaced apart from each other by the first common electrode, and the first transparent electrode and the first common electrode being connected to the common electrode line, respectively.

Alternatively, the step of forming the patterns of the first transparent electrodes on the first substrate includes:

forming patterns of the first transparent electrodes and the second transparent electrodes on the first substrate simultaneously by a single patterning process, the second transparent electrode being located below the transmitter electrode to be formed, the second transparent electrodes and the first transparent electrodes being alternately arranged, and the second transparent electrode being connected to a constant potential.

The step of forming the insulating layer on the first substrate with the patterns of the first transparent electrodes includes forming the insulating layer on the first substrate with the patterns of the first transparent electrodes and the second transparent electrodes.

The step of forming the patterns of the receiver electrodes spaced apart from each other on the first substrate with the insulating layer includes forming the patterns of the receiver electrodes and the transmitter electrodes on the first substrate with the insulating layer simultaneously by a single patterning process, the receiver electrodes and the transmitter electrodes being alternately arranged.

Alternatively, the method further includes a step of forming patterns of second common electrodes and second common electrode lines on the second substrate, the first transparent electrode, the second transparent electrode and the second common electrode being connected to the second common electrode line.

Alternatively, the method further includes a step of forming a light-shielding layer between the first substrate and a layer of the receiver electrodes.

Alternatively, in the step of forming the liquid crystal layer, liquid crystals are injected between the first substrate and the second substrate after they are arranged opposite to each other to form a cell, so as to form the liquid crystal layer; or the liquid crystals are injected onto the second substrate to form the liquid crystal layer, and then the first substrate and the second substrate are arranged opposite to each other to form a cell.

The embodiments of the present disclosure have the following advantages. The first transparent electrodes spaced apart from each other are arranged on the first substrate at a color filter substrate side and below the receiver electrodes in a direction where the display electrode on the second substrate is projected onto the first substrate. When the receiver electrodes and the transmitter electrodes are arranged at an identical layer, it is able to eliminate the coupling capacitance between the receiver/transmitter electrode and the electrodes on the array substrate. When the transmitter electrodes are arranged at an array substrate side, it is able to eliminate the coupling capacitance between the receiver electrodes and the common electrodes at the array substrate side as well as the coupling capacitance formed directly between the transmitter electrodes and the receiver electrodes after an electric field line passes through the liquid crystal layer. As a result, during the deflection of the liquid crystals, it is able to prevent a detection signal from being seriously affected and eliminate a noise caused by image switch, thereby to remarkably improve the quality of the touch display device.

Figure 1:
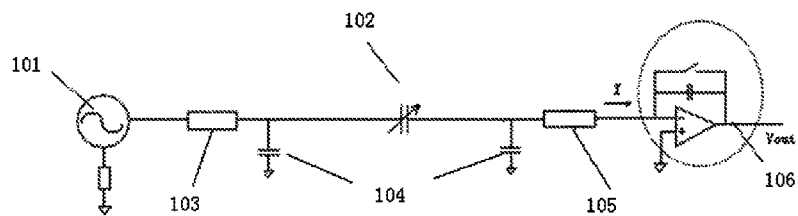
FIG. 1 is a view showing an equivalent circuit model of an existing mutually capacitive touch display device.

REFERENCE SIGNS 1 first substrate
2 light-shielding layer
3 insulating layer
4 color filter layer
5 liquid crystal layer
6 second substrate
7 display electrode
8 first common electrode
9 first transparent electrode
10 second transparent electrode
A TX proximal end
B TX intermediate end
C TX distal end

DETAILED DESCRIPTION

The present disclosure will be described hereinafter in conjunction with the drawings and the embodiments. The following embodiments are for illustrative purposes only, but shall not be used to limit the scope of the present disclosure.

Due to the special characteristics of a built-in touch mode, for an LCD (liquid crystal display), a detection value of a touch circuit will change in the event of image switch. Such a change is unpredictable, so it will become a random noise. In addition, usually the change in the detection value during the image switch is relatively large, even at an identical order of magnitude to a touch variation. The touch operation will be significantly affected if this change is not eliminated or decreased.

Reasons for the change in the detection value will be described hereinafter. In the event of image switch, liquid crystal molecules are deflected, which results in a change in a dielectric constant of the liquid crystal molecules and thereby results in influences on the capacitance. The following capacitances will be affected when the dielectric constant of the liquid crystal molecules is changed: (1) a capacitance formed between receiver electrodes and display electrodes (including a pixel electrode and a common electrode) at an array substrate side; (2) a capacitance formed directly between transmitter electrodes and the receiver electrodes after an electric field line passes through a liquid crystal layer; and (3) a capacitance formed between the transmitter electrodes and the receiver electrodes after the electric field line passes through the liquid crystal layer, a color filter substrate and air and then turns back. The capacitance (3) is a projection capacitance, and it is the only capacitance that is helpful to realize the detection and touch operations. However, this capacitance is formed after the electric field line passes through the color filter substrate and then turns back, so a travelling distance of the electric field line in the liquid crystal layer is very short, as compared with its entire travelling path, i.e., the projection capacitance is not much affected by the change in the dielectric constant. In fact, the above capacitances (1) and (2) are affected significantly.

First Embodiment

A touch display device in this embodiment is based on an On-cell technology of the built-in touch technologies.

Figure 2:
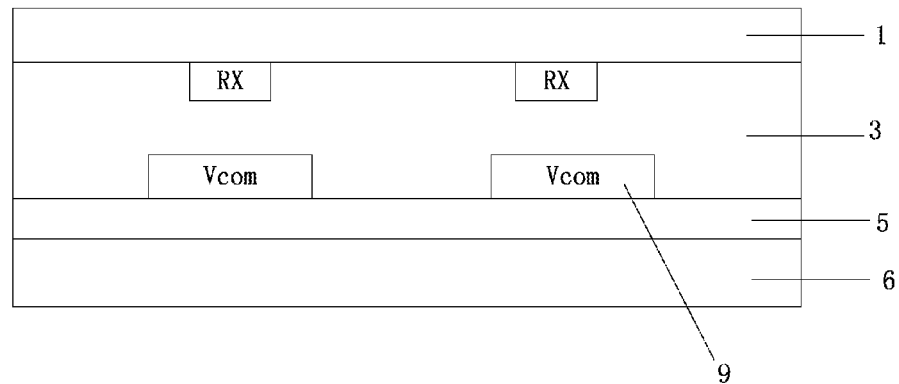
FIG. 2 is a schematic view showing a laminated structure of a touch display device according to the first embodiment of the present disclosure.

To be specific, as shown in FIG. 2, the touch display device in this embodiment includes a first substrate 1 and a second substrate 6 arranged opposite to each other, a liquid crystal layer 5 arranged between the first substrate 1 and the second substrate 6, and receiver electrodes RX arranged on the first substrate and spaced apart from each other. First transparent electrodes 9 spaced apart from each other are arranged on the first substrate 1 and below the receiver electrodes RX in a direction where a display electrode (not shown) on the second substrate is projected onto the first substrate. The first transparent electrode 9 is spaced apart from the receiver electrode RX through an insulating layer 3, and connected to a constant potential. Liquid crystals may be injected between the first substrate and the second substrate after they are arranged opposite to each other to form a cell, so as to form the liquid crystal layer 5; or the liquid crystals may be injected onto the second substrate 6 to form the liquid crystal layer 5, and then the first substrate 1 and the second substrate 6 are arranged opposite to each other to form a cell.

The first substrate 1 may be a color filter substrate and the second substrate 6 may be an array substrate. However, any other substrates may also be used, as long as the above-mentioned structures may be arranged thereon.

According to the touch display device in this embodiment, the first transparent electrodes 9 spaced apart from each other are arranged on the first substrate 1 and below the receiver electrodes RX in a direction where the display electrode on the second substrate 6 is projected onto the first substrate 1. When the receiver electrodes RX and the transmitter electrodes TX are arranged at an identical layer, it is able to eliminate the coupling capacitance between the receiver/transmitter electrodes and the electrodes on the second substrate 6. When the transmitter electrodes TX are arranged at a second substrate side, it is able to eliminate the coupling capacitance between the receiver electrodes RX and common electrodes (not shown) at a second substrate side as well as the coupling capacitance formed directly between the transmitter electrodes TX and the receiver electrodes after an electric field line passes through the liquid crystal layer 5. As a result, during the deflection of the liquid crystals, it is able to prevent a detection signal from being seriously affected and eliminate a noise caused by image switch, thereby to remarkably improve the quality of the touch display device.

Second Embodiment

The touch display device in this embodiment is based on an In-cell technology. The transmitter electrodes are arranged at an array substrate side, and the receiver electrodes are arranged at a color filter substrate side. Here, the first substrate is a color filter substrate and the second substrate is an array substrate.

Figure 5:
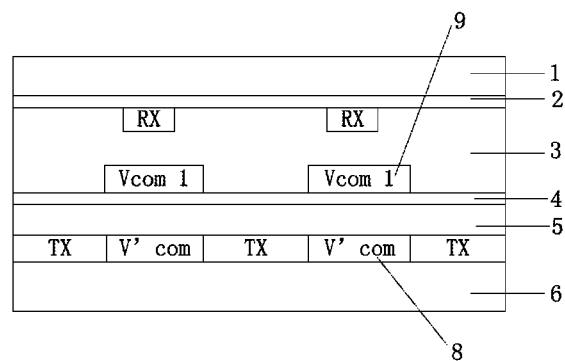
FIG. 5 is a schematic view showing a laminated structure of the touch display device according to the second embodiment of the present disclosure.

Referring to FIG. 5, the touch display device with a novel structure includes the first substrate 1 and the second substrate 6 arranged opposite to each other, the liquid crystal layer 5 arranged between the first substrate 1 and the second substrate 6, and the receiver electrodes RX arranged on the first substrate 1 and spaced apart from each other. A color filter layer 4 is arranged on the first substrate 1, and an array structure, e.g., a gate electrode, a source/drain electrode and a common electrode, is arranged on the second substrate 6.

Figure 3:
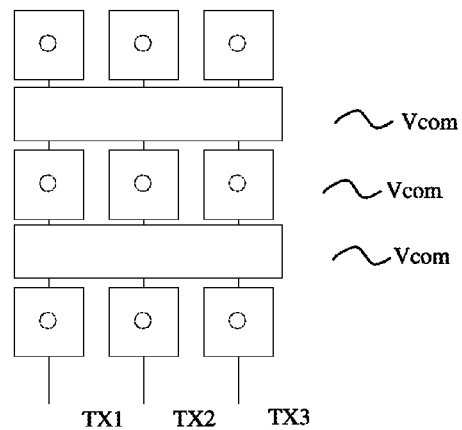
FIG. 3 is a planar view showing patterns of transmitter electrodes and common electrodes on an array substrate of the touch display device according to the second embodiment of the present disclosure.
Figure 4:
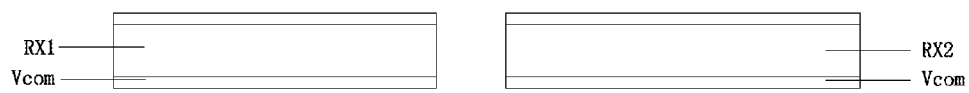
FIG. 4 is a schematic view showing a touch structure on a color filter substrate of the touch display device according to the second embodiment of the present disclosure.

Similar to the related art, the array substrate is used as the second substrate 6. As shown in FIG. 3, TX1, TX2 and TX3 are transmitter electrodes arranged parallel to each other. In the touch display device as shown in FIG. 5, an insulating layer and a transparent electrode (Vcom1) are arranged below the receiver electrodes TX at a color filter substrate side. FIG. 4 shows a layered structure, where RX1 and RX2 are two adjacent receiver electrodes, and the layer of the transparent electrode Vcom1 is arranged therebelow. The color filter layer 4 is arranged below the insulating layer 3 and the first transparent electrodes 9.

Referring again to FIG. 5, the transmitter electrodes TX spaced apart from each other are formed on the second substrate 6, and a first common electrode 8 is arranged between the adjacent transmitter electrodes TX. A transparent electrode V'com is used as the first common electrode 8 and arranged at an identical layer to the transmitter electrodes TX. Here, a common electrode (not shown) arranged at the second substrate 6 is called as a second common electrode, so as to be differentiated from the first common electrode 8. In order to eliminate the coupling capacitance between the receiver electrodes RX and the second common electrode at the second substrate side as well as the coupling capacitance directly formed between the transmitter electrodes TX and the receiver electrodes RX after an electric field line passes through the liquid crystal layer 5, the first transparent electrodes 9 (i.e., Vcom1 above the liquid crystal layer 5) are arranged at the color filter substrate side, i.e., on the first substrate 1, and below the receiver electrodes RX in a direction where the display electrode (not shown, which may be, e.g., a pixel electrode and a common electrode) on the second substrate 6 is projected onto the first substrate 1. The first transparent electrodes 9 are spaced apart from the receiver electrodes RX through the insulating layer 3, and connected to a constant potential. In a word, the first transparent electrodes 9, which are spaced apart from each other and to which a predetermined constant potential is applied, are arranged below the receiver electrodes RX, so it is able to eliminate the above capacitances (1) and (2) in a better manner. In addition, the first transparent electrodes 9 are spaced apart from each other, so as not to affect the projection capacitance between the transmitter electrodes and the receiver electrodes. In this way, during the deflection of the liquid crystals, it is able to prevent the detection signal from being affected significantly and eliminate a noise caused by the image switch, thereby to improve the quality of the touch display device.

It should be appreciated that, the first transparent electrode 9 is connected to a constant potential, which may apply a common voltage or any other constant voltage to the first transparent electrode 9, so as to eliminate the coupling capacitance. Alternatively, a potential of the first transparent electrode 9 is equal to that of the first common electrode 8. During the implementation, the first transparent electrode 9 and the first common electrode 8 are both connected to a common electrode line on the second substrate 6, so as to apply the common voltage thereto. As a result, it is able to prevent the formation of the capacitance between the first transparent electrode 9 and the first common electrode 8 on the second substrate 6, thereby to prevent the display from being adversely affected by this capacitance.

In the above structure, alternatively, the transparent electrode is a conductive electrode made of a transparent metal oxide, e.g., ITO (indium tin oxide) or IZO (indium zinc oxide), or made from a silver nanowire. Further, as shown in FIG. 5, a light-shielding layer 2, e.g., a black matrix made of resin or a light-shielding layer made of carbon particles, may be arranged between the first substrate 1 and the layer of the receiver electrodes RX.

Third Embodiment

The touch display device in this embodiment is based on an In-cell touch technology and has an ADS display mode. The transmitter electrodes and the receiver electrodes are all arranged at a color filter substrate side.

Figure 8:
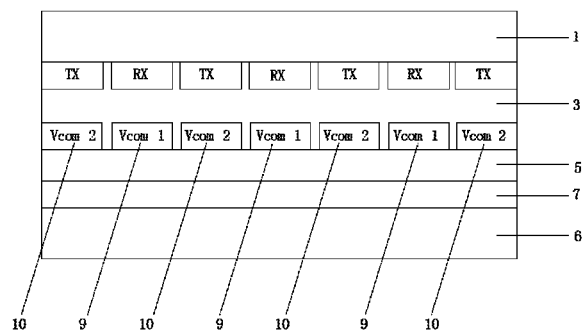
FIG. 8 is a schematic view showing a laminated structure of the touch display device according to the third embodiment of the present disclosure.

As shown in FIG. 8, the touch display device in this embodiment includes the first substrate 1 and the second substrate 2 arranged opposite to each other, the liquid crystal layer 5 arranged between the first substrate 1 and the second substrate 2, and the receiver electrodes RX and the transmitter electrodes TX alternately arranged on the first substrate 1. A color filter layer (not shown) is formed on the first substrate 1, and an array structure, e.g., display electrodes 7, is formed on the second substrate 6. For example, the display electrodes 7 include a gate electrode layer, a source/drain electrode, a pixel electrode and a common electrode. In order to eliminate the coupling capacitance between the receiver/transmitter electrodes and the display electrodes on the second substrate 6, in this embodiment, the first transparent electrodes (Vcom1)) 9 are formed on the first substrate 1 and below the receiver electrodes RX in a direction where the display electrodes on the second substrate 6 are projected onto the first substrate 1. In addition, second transparent electrodes (Vcom2) 10 are further arranged below the transmitter electrodes TX. The first transparent electrodes 9 and the second transparent electrodes 10 are alternately arranged at an identical layer. The first transparent electrodes 9 and the second transparent electrodes 10 are arranged at positions corresponding to the receiver electrodes RX and the transmitter electrodes TX, respectively, and both are connected to a constant potential.

In the above structure, alternatively, the transparent electrodes Vcom1 and Vcom2 are conductive electrodes made of a transparent metal oxide, e.g., ITO or IZO, or made from a silver nanowire. Further, a light-shielding layer (not shown), e.g., a black matrix made of resin or a light-shielding layer made of carbon particles, may be arranged between the first substrate 1 and the layer of the receiver electrodes and the transmitter electrodes.

Figure 6:
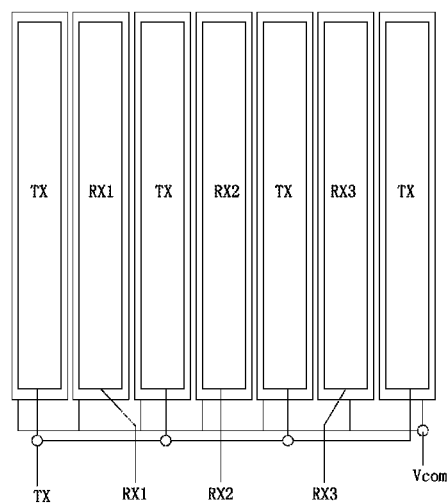
FIG. 6 is a schematic view showing the touch structure on the color filter substrate of the touch display device according to the third embodiment of the present disclosure.
Figure 7:
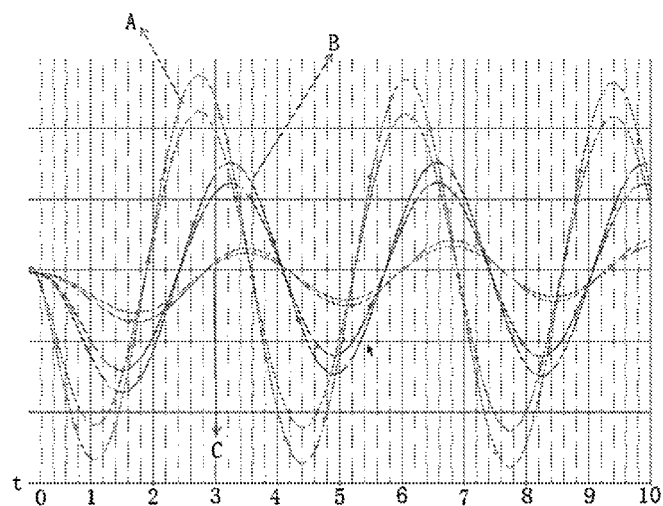
FIG. 7 is a waveform diagram showing amplitudes of X-axis coordinates obtained at a detection end in the touch display device according to the third embodiment of the present disclosure.

A touch detection mode that coordinates are determined by applying a touch is used in this embodiment, coordinates are determined in accordance with voltages applied to the transmitter electrodes and the receiver electrodes. To be specific, as shown in FIG. 6, a vertical coordinate is determined in accordance with a voltage applied to the transmitter electrodes TX, i.e., a waveform amplitude obtained at a detection end. As shown in FIG. 7, which is a waveform, the amplitudes gradually decrease from a TX proximal end A to a TX intermediate end B and then to a TX distal end C. A horizontal coordinate is determined by the receiver electrodes RX.

In this embodiment, as shown in FIG. 8, the layer of the transparent electrodes Vcom1 and Vcom2 arranged below the transmitter electrodes TX and the receiver electrodes RX is divided into electrode blocks spaced apart from each other, so as to serve as the first transparent electrodes 9 and the second transparent electrodes 10, respectively. The transmitter electrodes TX correspond to the second transparent electrodes 10 and the receiver electrodes RX correspond to the first transparent electrodes 9, and the first transparent electrodes 9 is separated from the second transparent electrodes 10. As a result, it is able to prevent the coupling capacitance between the transmitter/receiver electrodes and the layer of the transparent electrodes, thereby to prevent the projection capacitance between the transmitter electrodes TX and the receiver electrodes RX, as well as the sensitivity of a detection signal, from being adversely affected.

In the detection mode of this embodiment, the coordinates are determined in accordance with the voltages applied to the electrodes, and the parasitic capacitance of the transmitter electrodes and the receiver electrodes is highly demanded. Hence, the layer of the transparent electrodes Vcom1 and Vcom2 for applying a common voltage is arranged below the transmitter electrodes and the receiver electrodes, so as to meet this demand, thereby to eliminate the coupling resistance between the transmitter/receiver electrodes and the display electrodes on the array substrate. As a result, the touch detection will not be adversely affected by the deflection of the liquid crystals during the image switch.

Further, as shown in FIG. 8, a second common electrode (not shown) is arranged on the second substrate 6, and potentials of the first transparent electrode 9 and the second transparent electrode 10 are both equal to a potential of the second common electrode.

In this embodiment, the first transparent electrode 9 and the second transparent electrode 10 may be connected to a common electrode line on the second substrate 6, so as to apply a common voltage thereto. As a result, it is able to prevent the capacitance formed between the first/second transparent electrodes and the second common electrode on the second substrate, thereby to prevent the display from being adversely affected.

Fourth Embodiment

The present disclosure provides in this embodiment a method for manufacturing the touch display device in the first embodiment, which includes a step of providing a first substrate and a second substrate arranged opposite to each other. The method further includes steps of:

forming a pattern of a display electrode on the second substrate;

forming patterns of first transparent electrodes spaced apart from each other on the first substrate and below receiver electrodes to be formed in a direction where the display electrode on the second substrate is projected onto the first substrate, the first transparent electrode being connected to a constant potential;

forming an insulating layer on the first substrate with the patterns of the first transparent electrodes;

forming patterns of the receiver electrodes spaced apart from each other on the first substrate with the insulating layer; and forming a liquid crystal layer between the first substrate and the second substrate opposite to each other The layers of electrodes and the insulating layer may be formed by a conventional photolithographic process. According to the touch display device manufactured by the above-mentioned method, it is able to, during the deflection of the liquid crystals, prevent a detection signal from being affected significantly and eliminate a noise caused by the image switch, thereby to improve the quality of the touch display device.

Fifth Embodiment

Based on the fourth embodiment, as shown in FIG. 5, the method for manufacturing the touch display device in the second embodiment further includes steps of forming patterns of transmitter electrodes TX and first common electrodes 8 on the second substrate 6 simultaneously by a single patterning process, and forming patterns of first common electrode lines on the second substrate 6. The adjacent transmitter electrodes are spaced apart from each other by the first common electrode 8, and the first transparent electrode 9 and the first common electrode 8 are connected to the common electrode line, respectively.

A light-shielding layer 2, e.g., a black matrix made of resin or a light-shielding layer made of carbon particles, is formed between the first substrate 1 and the receiver electrodes RX, and a color filter layer 4 is formed below the insulating layer 3 and the first transparent electrode 9.

The first transparent electrode 9 and the first common electrode 8 are both connected to the common electrode line on the second substrate 6, so as to apply a common voltage thereto.

In the above-mentioned structure, alternatively, the transparent electrodes are conductive electrodes made of a transparent metal oxide, e.g., ITO or IZO, or made from a silver nanowire.

Sixth Embodiment

Based on the fourth embodiment, as shown in FIG. 8, in the method for manufacturing the touch display device in the third embodiment, the step of forming the patterns of the first transparent electrodes on the first substrate includes: forming patterns of the first transparent electrodes 9 and the second transparent electrodes 10 on the first substrate 1 simultaneously by a single patterning process. The second transparent electrode 10 is located below the transmitter electrode TX to be formed, the second transparent electrodes 10 and the first transparent electrodes 9 are alternately arranged, and the second transparent electrode 10 is connected to a constant potential.

The step of forming the insulating layer on the first substrate with the patterns of the first transparent electrodes includes forming the insulating layer 3 on the first substrate 1 with the patterns of the first transparent electrodes 9 and the second transparent electrodes 10.

The step of forming the patterns of the receiver electrodes spaced apart from each other on the first substrate with the insulating layer includes forming the patterns of the receiver electrodes RX and the transmitter electrodes TX on the first substrate 1 with the insulating layer 3 simultaneously by a single patterning process. The receiver electrodes and the transmitter electrodes are alternately arranged.

The method further includes a step of forming patterns of second common electrodes and second common electrode lines on the second substrate 6. The first transparent electrode 9, the second transparent electrode 10 and the second common electrode are connected to the second common electrode line.

A light-shielding layer, e.g., a black matrix made of resin or a light-shielding layer made of carbon particles, is formed between the first substrate 1 and the receiver electrodes RX, and a color filter layer is arranged below the insulating layer 3, the first transparent electrode 9 and the second transparent electrode 10.

In the above structure, alternatively, the transparent electrodes are conductive electrodes made of a transparent metal oxide, e.g., ITO or IZO, or made from a silver nanowire.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A touch display device, comprising:
a first substrate and a second substrate arranged opposite to each other, a liquid crystal layer arranged between the first substrate and the second substrate, and receiver electrodes arranged on the first substrate and spaced apart from each other, wherein
first transparent electrodes spaced apart from each other are arranged on the first substrate and below the receiver electrodes in a direction where a display electrode on the second substrate is projected onto the first substrate,
a first transparent electrode of the first transparent electrodes is spaced apart from a receiver electrode of the receiver electrodes through an insulating layer, and connected to a constant potential,
transmitter electrodes are arranged on the first substrate and spaced apart from each other,
the transmitter electrodes and the receiver electrodes are alternately arranged at an identical layer,
second transparent electrodes arranged on the first substrate and below the transmitter electrodes, and spaced apart therefrom by an insulating layer, and
a second transparent electrode of the second transparent electrodes and the first transparent electrode of the first transparent electrodes are alternately arranged at an identical layer, and the second transparent electrode is connected to a constant potential.

2. The touch display device according to claim 1, wherein a second common electrode is further arranged on the second substrate, and potentials of the first transparent electrode and the second transparent electrode are equal to a potential of the second common electrode.

3. The touch display device according to claim 1, wherein at least one of the first transparent electrode and the second transparent electrode are conductive electrodes comprising at least one of a transparent metal oxide and a silver nanowire.

4. The touch display device according to claim 1, wherein a light-shielding layer is arranged between the first substrate and a layer of the receiver electrodes.

5. A method for manufacturing a touch display device, comprising:
providing a first substrate and a second substrate opposite to each other;
forming a pattern of a display electrode on the second substrate;

forming patterns of first transparent electrodes spaced apart from each other on the first substrate and below receiver electrodes to be formed in a direction where the display electrode on the second substrate is projected onto the first substrate, the first transparent electrodes being connected to a constant potential;

forming an insulating layer on the first substrate with the patterns of the first transparent electrodes;

forming the patterns of the receiver electrodes spaced apart from each other on the insulating layer; and forming a liquid crystal layer between the first substrate and the second substrate opposite to each other, wherein forming the patterns of the first transparent electrodes on the first substrate further comprises:

forming patterns of the first transparent electrodes and second transparent electrodes on the first substrate simultaneously by a single patterning process, the second transparent electrodes being positioned below transmitter electrodes, the second transparent electrodes and the first transparent electrodes being alternately arranged at an identical layer, and the second transparent electrodes being connected to a constant potential, wherein the second transparent electrodes are spaced apart from each other.

6. The method according to claim 5, further comprising forming patterns of second common electrodes and second common electrode lines on the second substrate, wherein the first transparent electrode, the second transparent electrode, and the second common electrode are connected to the second common electrode line.

7. The method according to claim 5, further comprising forming a light-shielding layer between the first substrate and a layer of the receiver electrodes.

8. The method according to claim 5, further comprising injecting liquid crystals between the first substrate and the second substrate after they are arranged opposite to each other to form a cell to form the liquid crystal layer.

9. The method according to claim 5, further comprising injecting liquid crystals onto the second substrate to form the liquid crystal layer, and then the first substrate and the second substrate are arranged opposite to each other to form a cell.

10. The method according to claim 5, wherein the forming the insulating layer on the first substrate with the patterns of the first transparent electrodes further comprises:

forming the insulating layer on the first substrate with the patterns of the first transparent electrodes and the second transparent electrodes.

11. The method according to claim 5, wherein forming the patterns of the receiver electrodes spaced apart from each other on the first substrate with the insulating layer further comprises:

forming the patterns of the receiver electrodes and the transmitter electrodes on the first substrate with the insulating layer simultaneously by a single patterning process, the receiver electrodes and the transmitter electrodes being alternately arranged.

12. The method according to claim 10, further comprising forming patterns of second common electrodes and second common electrode lines on the second substrate, wherein the first transparent electrode, the second transparent electrode, and the second common electrode are connected to the second common electrode line.

13. The method according to claim 11, further comprising forming patterns of second common electrodes and second common electrode lines on the second substrate, wherein the first transparent electrode, the second transparent electrode, and the second common electrode are connected to the second common electrode line.

* * * * *